(12) United States Patent
Tapazoglou et al.

(10) Patent No.: US 7,175,532 B2
(45) Date of Patent: Feb. 13, 2007

(54) ENERGY ABSORBING PROPELLER SHAFT SYSTEM

(75) Inventors: Nicolaos Tapazoglou, Allen Park, MI (US); Hai Gu, Novi, MI (US); Gerald F Burke, Livonia, MI (US); Troy M Cornell, Grand Blanc, MI (US); James M. Culp, Rochester Hills, MI (US); Mark J. Kirschmann, Clarkston, MI (US); Douglas L. Nieset, Utica, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 41 days.

(21) Appl. No.: 10/754,422

(22) Filed: Jan. 9, 2004

(65) Prior Publication Data

US 2005/0150709 A1 Jul. 14, 2005

(51) Int. Cl.
*F16C 3/02* (2006.01)

(52) U.S. Cl. .................. 464/183; 180/232; 280/833

(58) Field of Classification Search ............... 464/162, 464/179, 183; 280/833, 834; 180/232, 379, 180/383
See application file for complete search history.

(56) References Cited

U.S. PATENT DOCUMENTS

| | | | | |
|---|---|---|---|---|
| 2,808,892 A * | 10/1957 | Walker | ................... | 280/834 X |
| 3,903,982 A * | 9/1975 | Van Winsen et al. | ........ | 180/379 |
| 4,050,534 A * | 9/1977 | Nelson et al. | | |
| 4,778,026 A * | 10/1988 | Uchida et al. | | |
| 5,566,777 A * | 10/1996 | Trommer et al. | ........... | 180/232 |
| 5,643,093 A * | 7/1997 | Breese | ....................... | 464/183 |
| 5,673,939 A * | 10/1997 | Bees et al. | .............. | 280/834 X |
| 5,820,464 A | 10/1998 | Parlato | | |
| 6,213,245 B1* | 4/2001 | Murata et al. | | |
| 6,241,617 B1* | 6/2001 | Jacob | ..................... | 464/179 X |
| 6,328,656 B1* | 12/2001 | Uchikawa et al. | .......... | 464/183 |
| 6,371,859 B1 | 4/2002 | Gibson | | |
| 6,394,215 B1* | 5/2002 | Masuda | ....................... | 180/232 |
| 6,435,299 B1* | 8/2002 | Miller | .................... | 180/379 X |
| 6,766,877 B2* | 7/2004 | Blumke et al. | ............. | 180/379 |
| 2003/0114232 A1* | 6/2003 | Bradley et al. | ............. | 464/183 |
| 2004/0259645 A1* | 12/2004 | Creek | ......................... | 464/162 |

* cited by examiner

*Primary Examiner*—Greg Binda
(74) *Attorney, Agent, or Firm*—Ralph E. Smith

(57) ABSTRACT

A dual-sectioned automotive propeller shaft features a weakened area in a first section. Under an axial load, the first section buckles transversely to a longitudinal axis of the shaft to absorb substantially all of the energy exerted against the shaft. A second section of the shaft is thereby isolated from consequences of the axial load enabling its placement and proximity to other components mounted to the undercarriage of the vehicle.

9 Claims, 4 Drawing Sheets

ENERGY ABSORBING PROPELLER SHAFT SYSTEM

BACKGROUND OF THE INVENTION

The present invention relates to a propeller shaft for a vehicle, more particularly, to a vehicular propeller shaft capable of absorbing energy from an impact by being deformed laterally of a longitudinal axis of the vehicle.

Known propeller shaft arrangements for automotive vehicles are sometimes arranged such that the shaft will deform along a longitudinal axis thereof in the event of a load being placed on a front end of the shaft. A disadvantage with energy absorption via axial deformation is that the overall distortion of the propeller shaft under an axial load is somewhat unpredictable, thereby limiting what other automotive components can be placed in the vicinity of the propeller shaft.

There is, therefore, seen to be a need in the art for effectively isolating at least a portion of a propeller shaft from energy absorbing consequences of an axial load applied to the shaft.

SUMMARY OF THE INVENTION

Accordingly, a vehicular propeller shaft system having a longitudinal axis of rotation includes a first section extending along the longitudinal axis between a first end adapted to be positioned toward a vehicular engine and a second distal end, the first section including a weakened area having maximum susceptibility to buckling transversely to the longitudinal axis under a generally axial load. A second section having a first end coupled to the second distal end of the first section and a second end adapted for coupling to a vehicle rear differential completes the propeller shaft system. Under the arrangement, when a predetermined generally axial load is applied to the first section, the first section buckles about the weakened area thereby absorbing substantially all of the axial load on the propeller shaft system.

BRIEF DESCRIPTION OF THE DRAWING

The objects and features of the invention will become apparent from a reading of a detailed description, taken in conjunction with the drawing, in which.

DETAILED DESCRIPTION

Figure 1:
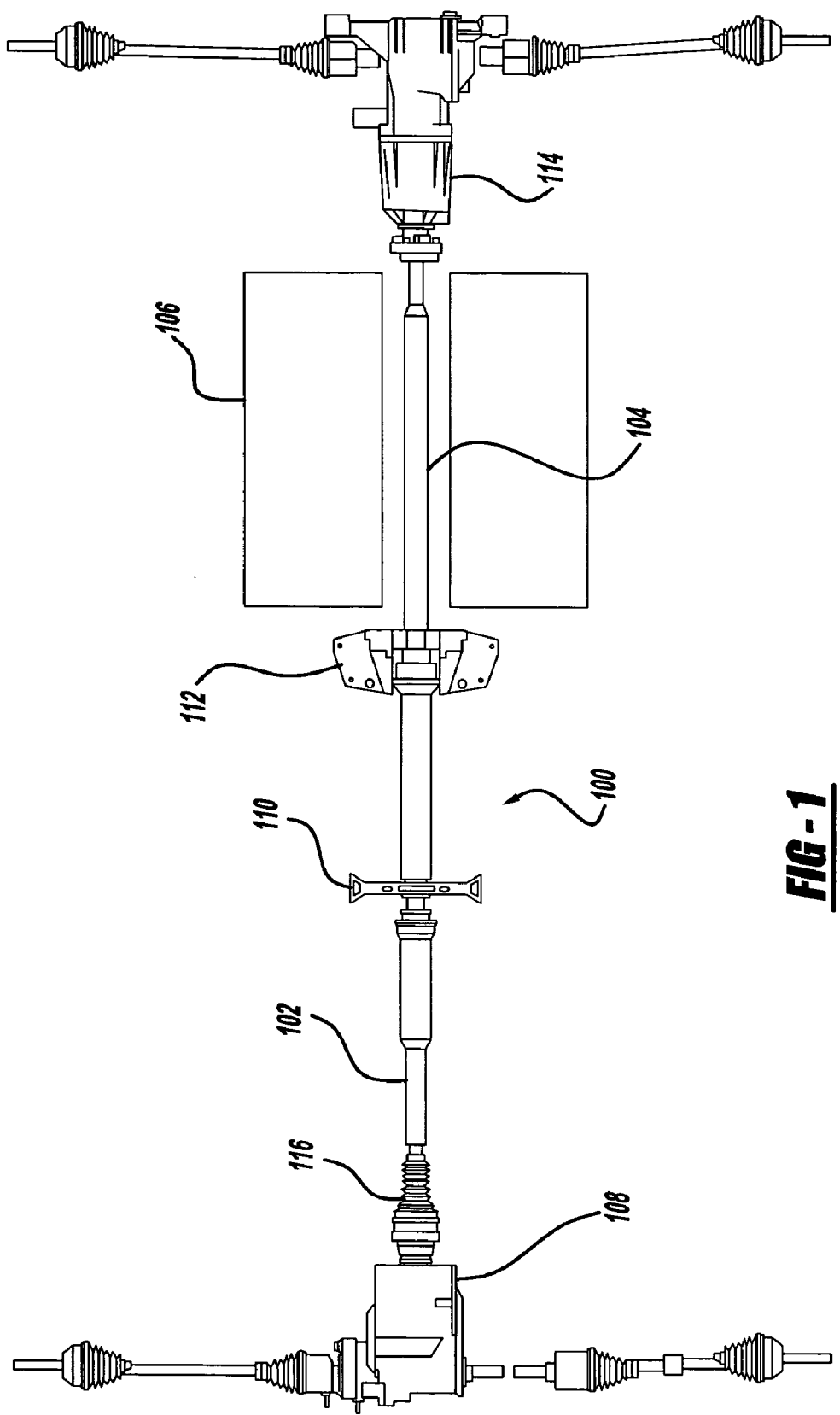
FIG. 1 is a top perspective view of a vehicular propeller shaft system arranged in accordance with the principles of invention.
Figure 2:
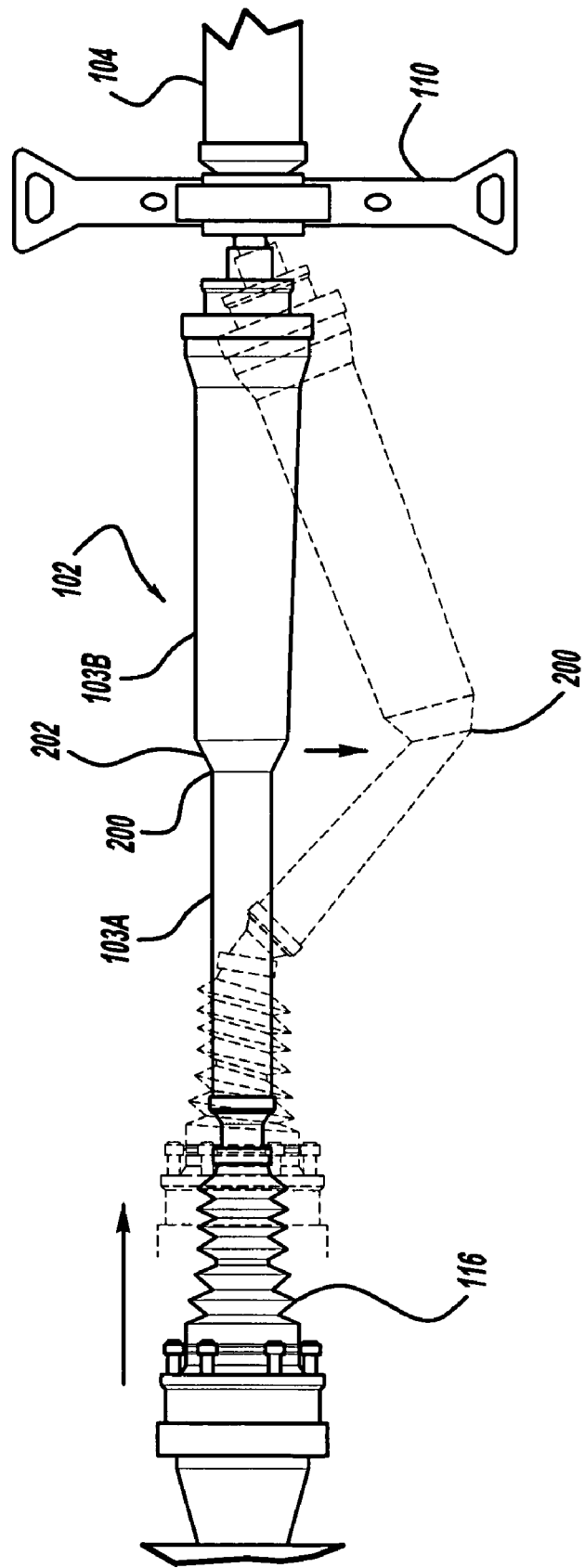
FIG. 2 is a more detailed top perspective view of a first section of the propeller shaft system of FIG. 1.

With reference to FIGS. 1 and 2, a two-piece propeller shaft system 100 includes an energy absorbing section 102 and a second rearward section 104. Section 102 includes a conventional bellows portion 116 which is coupled to a power transfer unit 108. Section 104 is coupled to a distal end of section 102 and at a second end to a rear differential 114.

Shaft system 100 is supported along its longitudinal axis by a front mounting bracket 110 and a center mounting bracket 112 as shown in the top view of FIG. 1.

As seen from FIG. 2, a swage or necked-down region 200 of shaft section 102 is placed intermediate the section's two ends and provides for a weakened area of shaft section 102 which is more susceptible to bending or buckling about area 200 than any other portion along the axial length of section 102. Region 200 comprises a tapered section 202 extending from a smaller diameter portion 103A of shaft section 102 to a larger diameter portion 103B of Section 102.

As shown in phantom outline form in FIG. 2, when an axial load is applied to the propeller shaft from the left as viewed in FIG. 2, section 102 absorbs the energy of this load by buckling about weakened area 200 as shown. With this approach, substantially all of the energy is absorbed in the front section 102 and section 104 is thereby isolated from the effects of the axial load. For this reason, section 104 will remain substantially stationary even under an axial load at the front end of the propeller shaft system and can therefore be placed in proximity to or be at least partially surrounded by vehicular components such as a fuel tank 106 as shown in FIG. 1.

Figure 3A:
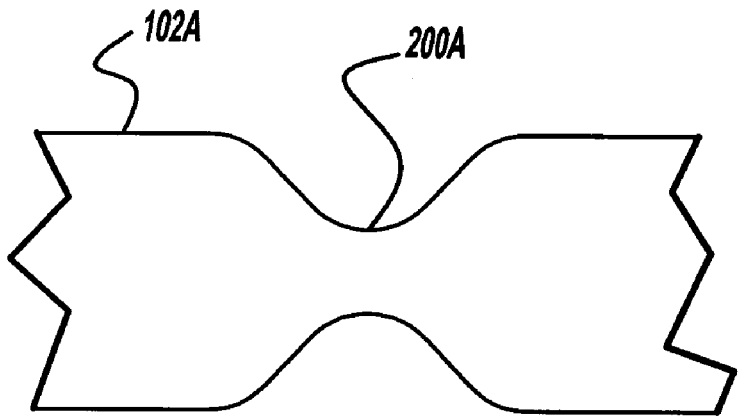
FIGS. 3A–3C depict three alternative approaches to providing a weakened area of the first section of the propeller shaft system of the invention.
Figure 3B:
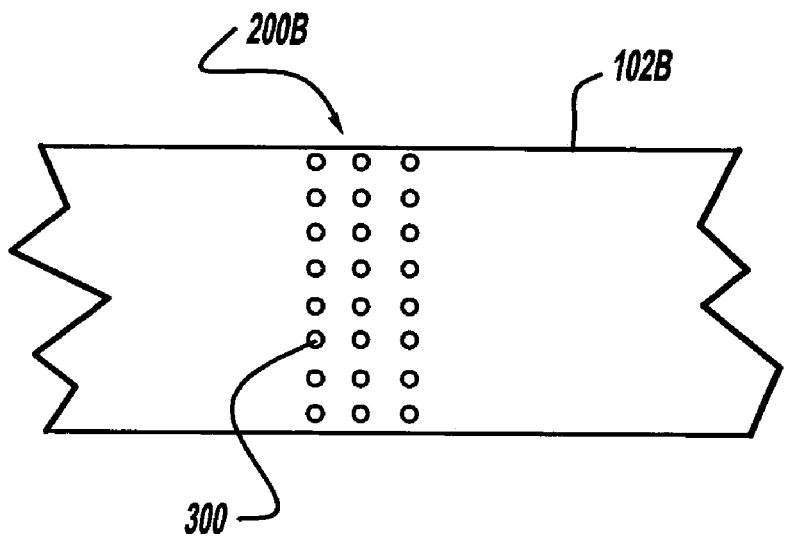
Figure 3C:
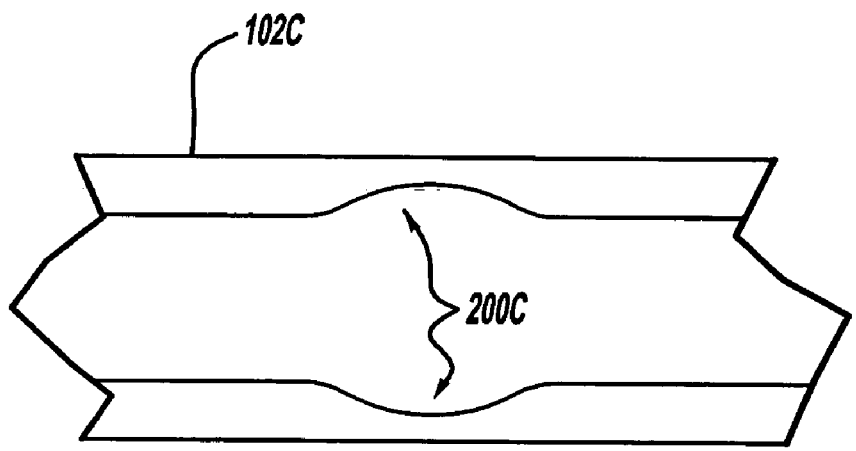

Weakened area 200 of shaft section 102 can be provided by a number of alternative approaches. FIGS. 3A, 3B and 3C set forth three additional alternative embodiments to providing for a weakened area in propeller shaft section 102.

In FIG. 3A, a necked-down region 200A provides a weakened area for shaft section 102A. In FIG. B, a plurality of perforations 300 provide for a weakened section 200B of shaft 102B thereby providing for the buckling of the section in a direction transverse to the longitudinal axis of the propeller shaft.

Finally, in FIG. 3C, the weakened area 200C can be formed by necking out the inner wall of propeller shaft 102C. Other alternatives will become apparent to those of ordinary skill in the art.

Figure 4:
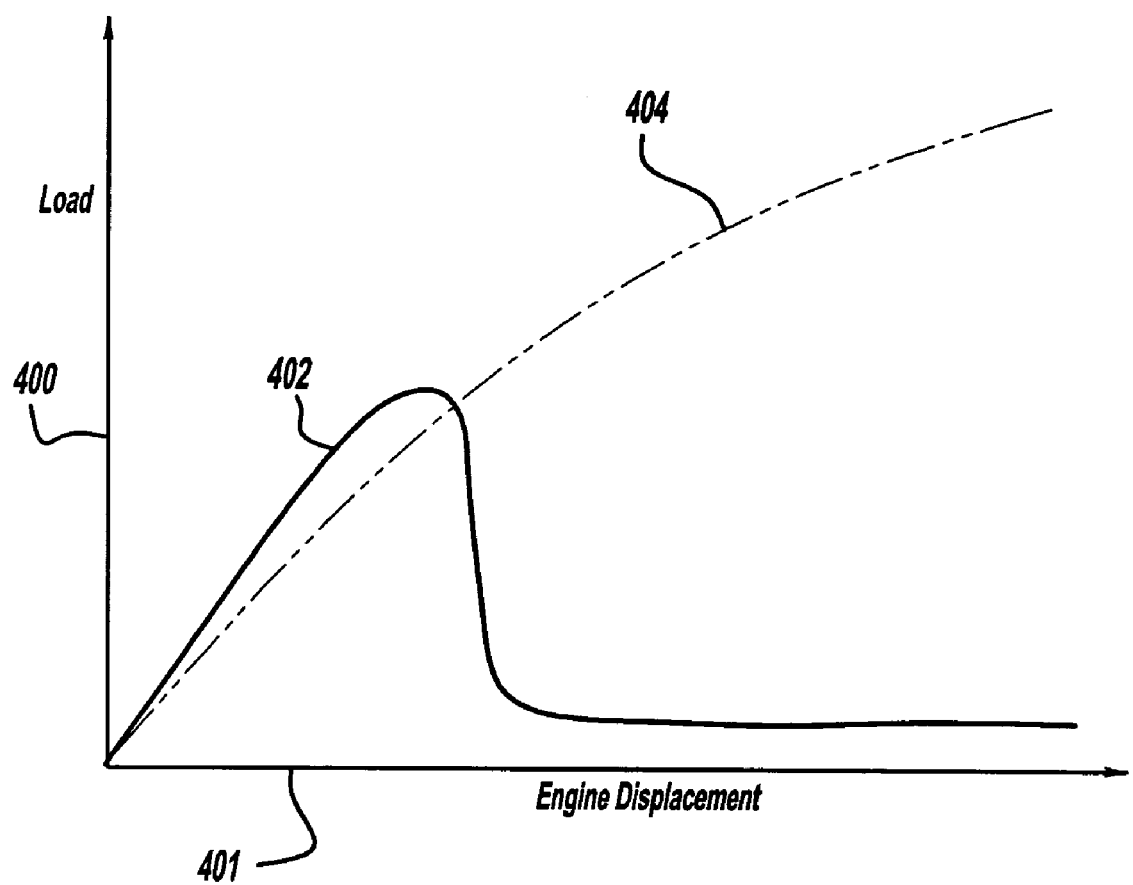
FIG. 4 is a graph depicting shaft load versus engine displacement in a typical front end collision for propeller shafts using and not using the principles of the invention.

FIG. 4 sets forth a graph with axial load represented by the vertical axis 400 and engine displacement represented by the horizontal axis 401. As shown in the dashed line 404, when a propeller shaft has no arrangement provided for energy absorption, the load will continually increase as the axial load exerted by engine displacement is placed upon the shaft system. When the principles of the instant invention are applied to a propeller shaft system, thereby providing for transverse bucking of the front section of the propeller shaft system, the load versus engine displacement is as shown in curve 402 of the graph of FIG. 4.

The invention has been described with reference to a detailed description for the sake of example only. The scope and spirit of the invention are to be determined from the appropriately interpreted appended claims.

What is claimed is:

1. A vehicular propeller shaft system having a longitudinal axis of rotation, the system comprising:

a first section extending along the longitudinal axis between a first end adapted to be positioned toward a vehicular engine and a second distal end, the first section including a weakened area which is more susceptible to bending or buckling than any other portion along an axial length of the first section; and a second section having a first end coupled to the second distal end of the first section and a second end adapted for coupling to a vehicular rear differential;

whereby when a predetermined generally axial load is applied to the first section, the first section buckles transversely to the longitudinal axis about the weakened area thereby absorbing substantially all of the axial load on the propeller shaft system and isolating the second section from effects of the axial load to enable the second section to remain substantially stationary under the axial load.

2. The propeller shaft system of claim 1 wherein the weakened area comprises a tapered section extending from a smaller diameter portion of the first section to a larger diameter portion of the first section.

3. The propeller shaft system of claim 1 wherein the weakened area comprises a perforate area of the first section.

4. The propeller shaft system of claim 1 wherein the weakened area comprises a necked-down portion of the front section having a smaller outer diameter than a remainder of the first section.

5. The propeller shaft system of claim 1 wherein the first section comprises a hollow tube having an inner and an outer diameter defining a tube wall and wherein the weakened area comprises a narrowed area in the tube wall having a larger inner diameter than the remainder of the first section.

6. The propeller shaft system of claim 1 wherein the second section is adapted to be at least partially surrounded by a vehicular fuel tank.

7. An automotive vehicle comprising:
a motive power source; and
a propeller shaft system extending along a longitudinal axis for transmitting power from the power source to a differential, the propeller shaft system including a first section extending along the longitudinal axis between the power source and a mounting bracket, the first section including a weakened area susceptible to buckling transversely to the longitudinal axis under a generally axial predetermined load, and a second section having a first end coupled to the first section at the mounting bracket and a second end coupled to the differential;
whereby when the generally axial predetermined load is applied to the first section, the first section buckles transversely to the longitudinal axis at the weakened area and the second section remains substantially stationary in any direction transverse to the longitudinal axis.

8. The vehicle of claim 7 further comprising an additional mounting bracket located rearwardly of the mounting bracket and supporting the second section.

9. The vehicle of claim 7 wherein the second section is at least partially surrounded by a fuel tank of the vehicle.

* * * * *